June 20, 1967 W. FOO 3,326,299
LAWN EDGE TRIMMERS
Filed Sept. 7, 1965
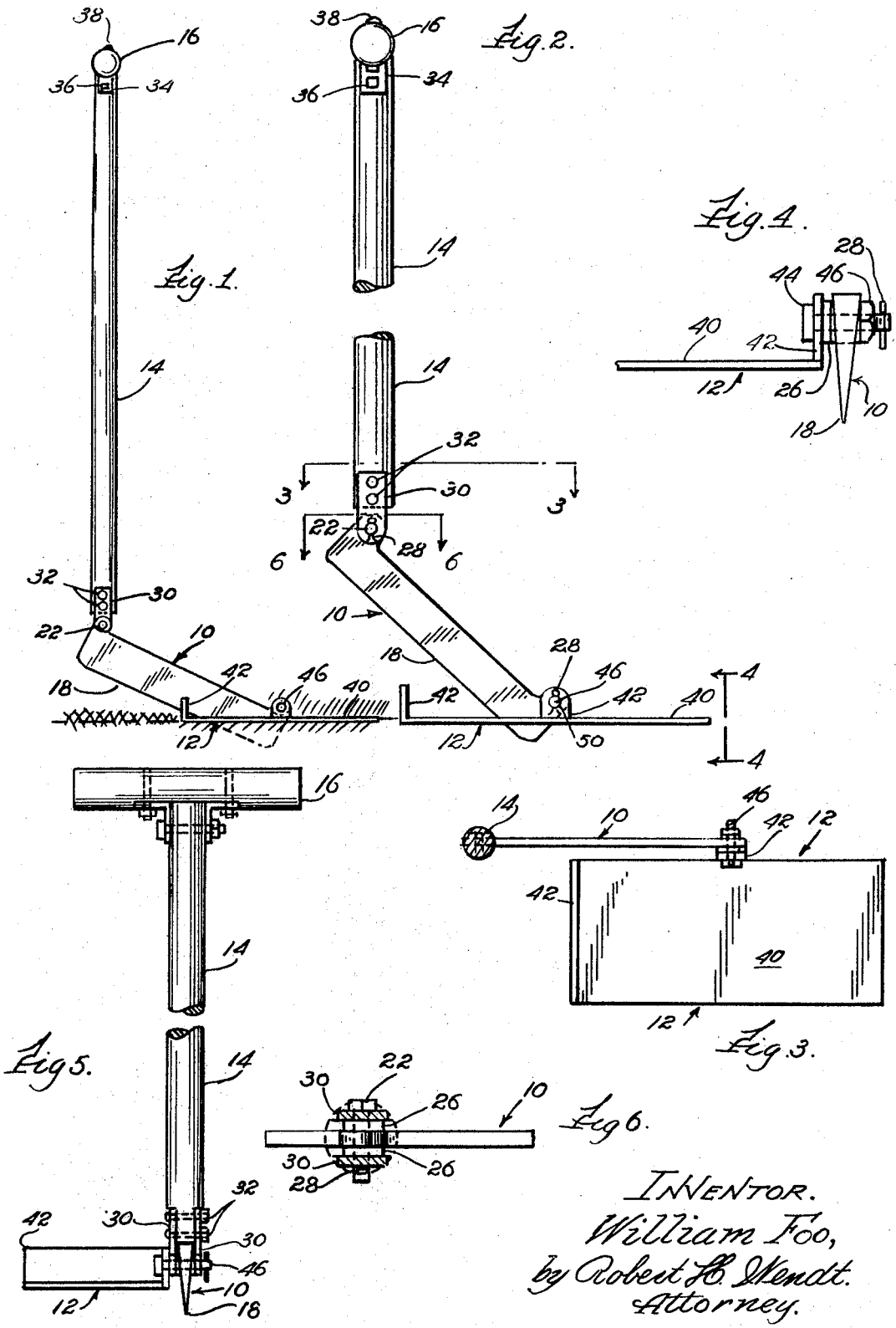
INVENTOR.
William Foo,
by Robert H. Wendt.
Attorney.

3,326,299
LAWN EDGE TRIMMERS
William Foo, 5044 Greenleaf St., Skokie, Ill. 60076
Filed Sept. 7, 1965, Ser. No. 485,329
3 Claims. (Cl. 172—13)

The present invention relates to lawn edge trimmers and is particularly concerned with an improved lawn edge trimmer which is distinguished by its simplicity and the elimination of unnecessary parts.

One of the objects of the invention is the provision of an improved lawn edge trimmer having a minimum number of parts, which operate together with maximum efficiency, which are adapted to be manufactured most economically, and which can be sold at a price within the means of a vast number of users.

Another object is the provision of a lawn edge trimmer which can be manufactured without special machine equipment, other than that which is used in a home machine shop, and the parts of which are secured together in such a manner that all the parts may be removed or replaced by an ordinary home mechanic, so that the supply and installment of new parts is a very simple procedure.

Other objects and advantages of the invention will be apparent from the following description and the accompanying drawings, in which similar characters of reference indicate similar parts throughout the several views.

Referring to the single sheet of drawings accompanying this specification;

FIG. 1 is a side elevation (in operation);

FIG. 2 is a side elevational view;

FIG. 3 is a detail section taken on the plane of the line 3—3, of FIG. 2, looking in the direction of the arrows;

FIG. 4, is a rear elevational view of the lower part of the edger;

FIG. 5 is a front elevational view; and

FIG. 6 is a sectional view taken on the plane of the line 6—6, looking in the direction of the arrows.

Referring to FIG. 1, the present lawn edge trimmer is distinguished by its simplicity and minimum number of parts.

It preferably includes a blade 10, a step plate 12, a wooden rod 14, and a wooden cross handle 16.

The blade 10 has a lower sharpened cutting edge 18, which may be bevelled on either or both edges, but is preferably bevelled on the side away from the sidewalk.

The blade is elongated and narrow, to accomplish its purpose with a minimum cost, and it has an aperture at its front upper corner for a bolt 22 by means of which it is pivoted to the lower end of rod 14.

The bolt 22 extends through holes in the lower end of metal plates 30 and also supports a washer 26 on each side of blade 10. The bolt 22 has a head on one end and a transverse cotter pin in a hole in that end of the bolt.

The plates 30 are both mounted on the lower end of rod 14, by means of a pair of bolts 32 and nuts, passing through plates 30 and rod 14, which is cut down to fit against the plates 30. By having two bolts 32, the plates are rigidly mounted on the rod 14. At its upper end, rod 14 supports a cross handle 16, by means of angle brackets 34 and bolts 16, and nuts, clamping one end of the angle brackets to the rod 14.

The other end of each angle bracket 34 is secured to cross handle 16, by bolts 38 and nuts, thus making the upper handle rigid with the rod 14. The length of rod 14 is such that the user may grasp the cross handle 16 and push down on the rod 14 and blade 10, to effect the trimming.

The step plate area 40 is long enough to receive the foot of the user, and of suitable width for the foot. At its forward edge the step plate 12 has a turned up stop flange 42 to engage the front of the shoe of the user, who is to push the step plate 12 forward after each downward push of the blade 10.

The blade 10 is pivoted to the step plate 12 at 46, on the upper corner 48 of the blade 10, by a bolt which has a head 44 on one end and a cotter pin 28 in the other end, with a washer 26, located between the blade and flange 42.

In some embodiments of the invention, the upper corner 48 may have an upwardly projecting ear 49, for receiving bolt 50.

The operation of the lawn edge trimmer is as follows:

The step plate is placed on the cement sidewalk with the blade in position to cut the grass at the edge of the sidewalk. The rear corner of the blade is forced into trimming position by stepping down on the step plate.

The operation is begun by pushing down on the cross handle 16, and rod 14, which pivots at 22 on the blade, forcing the blade down beside the edge of the sidewalk, and trimming the grass and other vegetation at the edge of the walk. One or more strokes downward may be made, if needed to effect the trimming.

After each downward stroke, the handle is pulled upward, and the step plate is pushed forward by the foot of the user, and the user may alternately push forward on the step plate, and downward on the handle.

While the rod 14, and cross handle 16, may also be made of metal pipe, for a de luxe model, but the wooden rod and handle will be found more economical.

The present device has been used and tested and found very efficient. It is also economical as it may be made more cheaply than the devices of the prior art, which have more parts and are less efficient.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A lawn edge trimmer comprising a step plate to receive the foot of the user, and to slide on the sidewalk, said step plate having a forward flange to be engaged by the foot in pushing the step plate forward, said step plate having an elongated and narrow blade, with a lower cutting edge, said blade being pivoted to an upturned flange on the step plate at the upper rear corner of the blade, so that the blade may have its lower rear cutting edge forced into the ground by a foot on the step plate to start the trimming, the blade guiding the step plate along the edge of the walk, and an upwardly extending rod pivoted to the blade at the upper front corner of the blade, said rod being forced down to drive the blade into the earth at the edge of the walk to trim the grass, and the assembly being adapted to effect trimming by alternately pushing down on the rod and forward on the step plate.

2. A lawn edge trimmer according to claim 1, in which the rod has a rigid cross handle at its upper end for easier downward push of the rod and blade.

3. A lawn edge trimmer according to claim 2, in which the parts may be removed and replaced by the use of ordinary household tools.

References Cited

UNITED STATES PATENTS 2,503,757  4/1950  Morgan _____ 172—18 X
2,949,670  8/1960  Birchfield _____ 30—315
3,232,351  2/1966  Wilson _____ 172—374 X

FOREIGN PATENTS 1,840  1912  Great Britain.

ABRAHAM G. STONE, *Primary Examiner.*
J. R. OAKS, *Assistant Examiner.*